United States Patent [19]

Hittich et al.

[11] Patent Number: 5,271,865
[45] Date of Patent: Dec. 21, 1993

[54] LIQUID-CRYSTALLINE MIXTURE OF LOW VISCOSITY

[75] Inventors: Reinhard Hittich, Modautal; Herbert Plach, Darmstadt; Volker Reiffenrath, Rossdorf, all of Fed. Rep. of Germany

[73] Assignee: Merck Patent Gesellschaft mit beschrankter Haftung, Darmstadt, Fed. Rep. of Germany

[21] Appl. No.: 674,367

[22] PCT Filed: Jan. 28, 1991

[86] PCT No.: PCT/EP91/00156
  § 371 Date: Apr. 10, 1991
  § 102(e) Date: Apr. 10, 1991

[87] PCT Pub. No.: WO91/12294
  PCT Pub. Date: Aug. 22, 1991

[30] Foreign Application Priority Data

Feb. 13, 1990 [DE] Fed. Rep. of Germany ....... 4004269
Feb. 20, 1990 [DE] Fed. Rep. of Germany ....... 4005237
Feb. 20, 1990 [DE] Fed. Rep. of Germany ....... 4005237
Feb. 20, 1990 [DE] Fed. Rep. of Germany ....... 4005238

[51] Int. Cl.$^5$ .................. C09K 19/52; C09K 19/30; C09K 19/20; G02F 1/13
[52] U.S. Cl. ............... 252/299.01; 252/299.61; 252/299.63; 252/299.66; 252/299.67; 359/103
[58] Field of Search ......... 252/299.01, 299.5, 299.61, 252/299.63, 299.66, 299.67; 428/1; 359/103, 104

[56] References Cited

U.S. PATENT DOCUMENTS 4,759,870 7/1988 Fujimura ............... 252/299.63
4,917,818 4/1990 Sawada et al. ........... 252/299.61

FOREIGN PATENT DOCUMENTS 56-120641 9/1981 Japan.
58-238975 12/1983 Japan.

OTHER PUBLICATIONS

Sage, I "Materials requirements for nematic of chiral nematic electrooptical display" edited by Gray in Themstropic Liquid Crystal, pp. 64-66, 1987.

Primary Examiner—Robert L. Stoll
Assistant Examiner—Shean C. Wu
Attorney, Agent, or Firm—Millen, White, Zelano & Branigan

[57] ABSTRACT

The invention relates to a liquid-crystalline mixture containing one or more compounds of the general formula

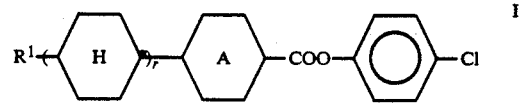

I in which $R^1$ is straight-chain alkyl having 2 to 12 carbon atoms in which, in addition, one $CH_2$ group may be replaced by —O— or —CH=CH—, the ring A is 1,4-phenylene or trans-1,4-cyclohexylene, and r is 0 or 1, and one or more highly dielectrically positive compounds selected from the group comprising the compounds of the general formulae II, III and IV in a weight ratio between the compounds of the formula I and the compounds of the formulae II, III and IV of from 1:10 to 10:1:

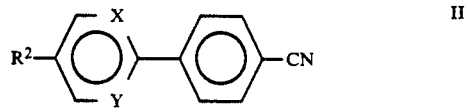

II in which $R^2$ has one of the meanings indicated for $R^1$, and

X and Y are each, independently of one another, CH or N,

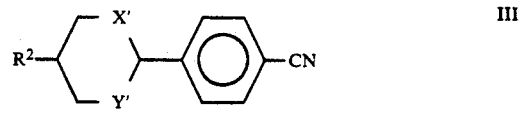

III (Abstract continued on next page.)

in which $R^2$ has one of the meanings indicated for $R^1$,
and X' and Y' are $CH_2$ or O,
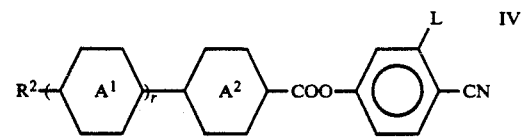
in which $R^2$ has one of the meanings indicated for $R^1$, r is as defined above, the rings $A^1$ and $A^2$ have one of the meanings indicated for A, and L is H or F.
6 Claims, No Drawings

LIQUID-CRYSTALLINE MIXTURE OF LOW VISCOSITY

The present invention relates to a liquid-crystalline mixture of low viscosity, and to the use thereof for electrooptical purposes.

BACKGROUND OF THE INVENTION

Liquid crystals are used, in particular, as dielectrics in display devices since the optical properties of such substances can be affected by an applied voltage. Electrooptical devices based on liquid crystals are extremely well known to those skilled in the art and may be based on various effects Devices of this type are, for example, cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The most common display devices are based on the Schadt-Helfrich effect and have a twisted nematic structure.

The liquid-crystal materials must have good chemical and thermal stability and good stability toward electrical fields and electromagnetic radiation, especially in the visible and ultraviolet spectral range. Furthermore, the liquid-crystal materials should have low viscosity and give short addressing times, low threshold voltages and high contrast in the cells. Furthermore, they should have a suitable mesophase, for example, for the above-mentioned cells, a nematic or cholesteric mesophase, at customary operating temperatures, i.e. generally in the broadest possible range above and below room temperature. Since liquid crystals are generally used as mixtures of a plurality of components, it is important that the components are readily miscible with one another. Further properties, such as electrical conductivity, dielectric anisotropy and optical anisotropy, must meet various requirements depending on the cell type and the area of application. For example, materials for cells having a twisted nematic structure should have positive dielectric anisotropy and low electrical conductivity.

For display devices addressed with low multiplex ratios (common use displays), which are the preferred subject-matter of the present invention, nematic mixtures having clearing points above 55° (preferably above 65°), birefringence in the range from 0.04 to 0.33 (preferably from 0.07 to 0.23) and dielectric anisotropy in the range from 1.5 to 39 (preferably from 4 to 19) are desired.

A known mixture from the prior art is E7 (BDH, Poole, Great Britain), which contains cyanobiphenyls and has the following parameters $T_{N,I} = 60.5°$ $\Delta n = 0.225$ $\eta_{20} = 39$ cSt $V_{10}(TN) = 1.5$ volts For many applications, however, mixtures of this type have undesired high viscosity and/or excessively low dielectric anisotropy, which results in undesirably long switching times for excessive threshold voltages.

SUMMARY OF THE INVENTION

The invention on relates to a liquid-crystalline mixture containing one or more compounds of the general formula

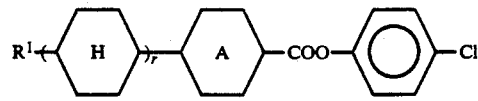

in which $R^1$ is straight-chain alkyl having 2 to 12 carbon atoms in which, in addition, one $CH_2$ group may be replaced by —O— or —CH=CH—, the ring A is 1,4-phenylene or trans-1,4-cyclohexylene, and r is 0 or 1.

DESCRIPTION OF THE INVENTION

It has been found that even a relatively small proportion of compounds of the formula I mixed with one or more compounds of the formula II, III or IV results in a considerable improvement in the addressing times and in low threshold voltages The compounds of the formula II have high optical anisotropy. However, the optical anisotropy of the mixture in the mixing range indicated is increased only relatively little by the compounds of the formula II, while the threshold voltage is significantly improved. Larger amounts of a compound of formula II generally only cause a slight improvement in the threshold voltage, but a comparatively large increase in the viscosity. The invention thus facilitates liquid-crystal mixtures of low viscosity and short switching times.

Furthermore, the addition of a compound of the formula II frequently lowers the melting point of the mixture. The compounds of the formula I and II are colorless, stable and readily miscible with one another and with other liquid-crystal components.

The compounds of the formula III have low optical anisotropy. However, the optical anisotropy of the mixture in the mixing range indicated is reduced only relatively little by the compounds of the formula III, while the threshold voltage is significantly improved Larger amounts of a compound of the formula III generally cause only a slight improvement in the threshold voltage. The invention thus facilitates liquid-crystal mixtures of low viscosity and short switching times.

Furthermore, the addition of a compound of the formula III frequently lowers the melting point of the mixture. The compounds of the formula I and III are colorless, stable and readily miscible with one another and with other liquid-crystal components.

The compounds of the formula IV have high dielectric anisotropy. The optical anisotropy of the mixture in the mixing range indicated is changed only relatively little by the compounds of the formula IV, while the threshold voltage is significantly improved Larger amounts of a compound of the formula IV generally cause only a slight improvement in the threshold voltage, but a comparatively large increase in the viscosity. The invention thus facilitates liquid-crystal mixtures of low viscosity and short switching times.

Furthermore, the addition of a compound of the formula IV frequently lowers the melting point of the mixture. The compounds of the formula I and IV are colorless, stable and readily miscible with one another and with other liquid-crystal components.

The term straight-chain alkyl having 2 to 12 carbon atoms covers the straight-chain groups ethyl, propyl, butyl, pentyl, hexyl, heptyl, octyl, nonyl, decyl, undecyl and dodecyl Groups having 2-7 carbon atoms are generally preferred.

Preferred radicals $R^1$ and $R^2$ in which a $CH_2$ group in the alkyl ethers has been replaced by —O— or —CH═CH— are indicated below:

Alkoxy groups having 1-12 carbon atoms, in particular the straight-chain groups methoxy, ethoxy, propoxy, butoxy, pentoxy, hexoxy, heptoxy, octoxy, nonoxy and decoxy. Groups having 1-7 carbon atoms are generally preferred.

Alkenyl groups having 2-12 carbon atoms, in particular the straight-chain groups $C_8$-$C_{12}$-7-alkenyl, in particular $C_4$-$C_{12}$-3E-alkenyl, $C_5$-$C_{12}$-4-alkenyl, $C_6$-$C_{12}$-5-alkenyl, $C_7$-$C_{12}$-6-alkenyl and $C_8$-$C_{12}$-7-alkenyl, in particular $C_2$-$C_{12}$-1E-alkenyl, $C_4$-$C_{12}$-3E-alkenyl and $C_5$-$C_{12}$-4-alkenyl. Examples of preferred alkenyl groups are vinyl, 1E-propenyl, 1E-butenyl, 1E-pentenyl, 1E-hexenyl, 1E-heptenyl, 1E-octenyl, 1E-nonenyl, 3-butenyl, 3E-pentenyl, 3E-hexenyl, 3E-octenyl, 3E-nonenyl, 4-pentenyl, 4Z- hexenyl, 4E-hexenyl, 4Z-heptenyl, 4Z-octenyl, 4Z-nonenyl, 5-hexenyl, 6-heptenyl, 7-octenyl and the like. Groups having up to 7 carbon atoms are generally preferred.

The compounds of the formulae I and II are known or analogs of known compounds. Suitable methods for the preparation of these compounds are known to a person skilled in the art.

Formula I covers the weakly polar compounds of the general formulae

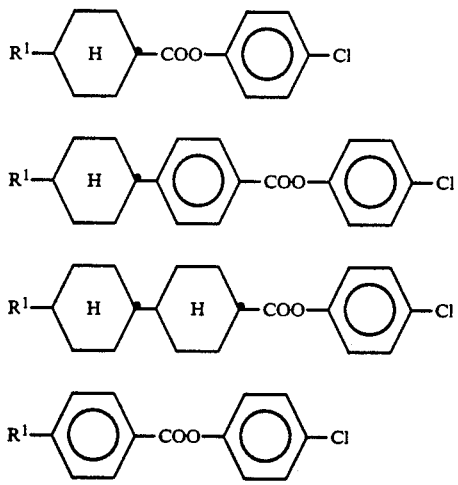

of which Ia, Ib and Ic are particularly preferred.

Formula II covers the highly polar compounds of the formulae

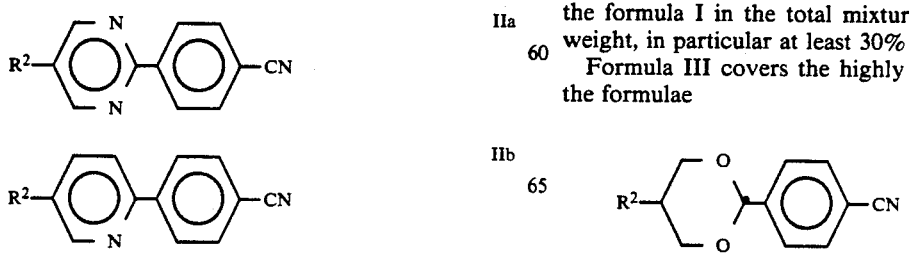

of which IIa and IIb are particularly preferred for achieving particularly low threshold voltages and IIc is particularly preferred for mixtures of particularly high stability.

Through a suitable choice of the meanings of $R^1$, $R^2$, r, X, Y and the ring A, the addressing times, the threshold voltage, the steepness of the transmission characteristic lines, etc., can be modified in the desired manner. For example, 1E-alkenyl radicals, 3E-alkenyl radicals and the like generally result in shorter addressing times, improved nematic phase ranges and a higher ratio between the elastic constants $k_{33}$ (bend) and $K_{11}$ (splay) compared with alkyl or alkoxy radicals. 4-Alkenyl radicals, 3-alkenyloxy radicals and the like generally give lower threshold voltages and smaller values of $k_{33}/k_{11}$ compared with alkyl and alkoxy radicals.

The optimum mixing ratio of the compounds of the formula I and II depends substantially on the desired properties, on the choice of the components of the formula I and II and on the choice of any other components which may be present. Suitable mixing ratios within the abovementioned range can easily be determined from case to case. In general, a ratio between the total weight of compounds of the formula I and the total weight of compounds of the formula II of from about 3:1 to 10:1 is preferred.

The total amount of compounds of the formula I and II in the mixtures according to the invention is not crucial. The mixtures can therefore contain one or more further components in order to optimize various properties. However, the observed effect on the addressing times and the threshold voltage is generally the greater, the higher the total concentration of the compounds of the formula I and II.

Preferred mixtures according to the invention are therefore those in which the proportion of compounds of the formulae I and II together in the total mixture is at least 50% by weight, and in particular those in which the proportion of compounds of the formula I and II together is at least 65% by weight. It goes without saying that the proportion may also be up to 100% by weight.

Preferred concentration ranges for the compounds of the formula I or II arise from the indicated weight ratios and the preferred total amounts. Particular preference is given to mixtures in which the proportion of one or more compounds of the formula II in the total mixture is 10–40% by weight, in particular 10–30% by weight. Furthermore, particularly preferred mixtures are those in which the proportion of one or more compounds of the formula I in the total mixture is at least 15% by weight, in particular at least 30% by weight.

Formula III covers the highly polar compounds of the formulae

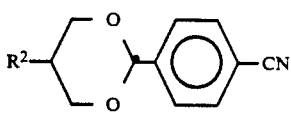

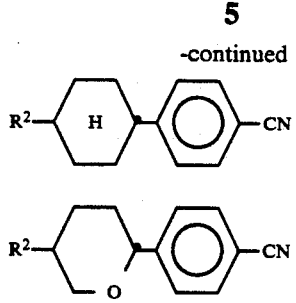
IIIb

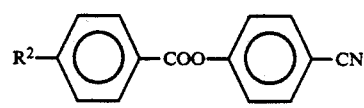
IIIc of which IIIa and IIIb are particularly preferred.

Through a suitable choice of the meanings of $R^1$, $R^2$, r, X, Y and the ring A, the addressing times, the threshold voltage, the steepness of the transmission characteristic lines, etc., can be modified in the desired manner. For example, 1E-alkenyl radicals, 3E-alkenyl radicals and the like generally result in shorter addressing times, improved nematic phase ranges and a higher ratio between the elastic constants $k_{33}$ (bend) and $K_{11}$ (splay) compared with alkyl or alkoxy radicals. 4-Alkenyl radicals, 3-alkenyloxy radicals and the like generally give lower threshold voltages and smaller values of $k_{33}/k_{11}$ compared with alkyl and alkoxy radicals.

The optimum mixing ratio of the compounds of the formula I and III depends substantially on the desired properties, on the choice of the components of the formula I and III and on the choice of any other components which may be present. Suitable mixing ratios within the abovementioned range can easily be determined from case to case. In general, a ratio between the total weight of compounds of the formula I and the total weight of compounds of the formula III of from about 3:1 to 10:1 is preferred.

The total amount of compounds of the formula I and III in the mixtures according to the invention is not crucial. The mixtures can therefore contain one or more further components in order to optimize various properties. However, the observed effect on the addressing times and the threshold voltage is generally the greater, the higher the total concentration of the compounds of the formula I and III.

Preferred mixtures according to the invention are therefore those in which the proportion of compounds of the formulae I and III together in the total mixture is at least 50% by weight, and in particular those in which the proportion of compounds of the formula I and III together is at least 65% by weight. It goes without saying that the proportion may also be up to 100% by weight.

Preferred concentration ranges for the compounds of the formula I or III arise from the indicated weight ratios and the preferred total amounts. Particular preference is given to mixtures in which the proportion of one or more compounds of the formula III in the total mixture is 10-40% by weight, in particular 10-30% by weight. Furthermore, particularly preferred mixtures are those in which the proportion of one or more compounds of the formula I in the total mixture is at least 15% by weight, in particular at least 30% by weight.

Formula IV covers the highly polar compounds of the formulae

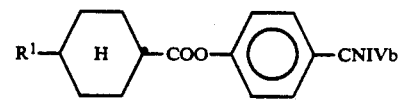
IVa

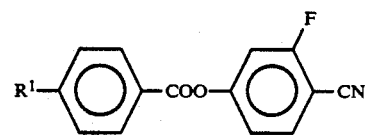
IVb

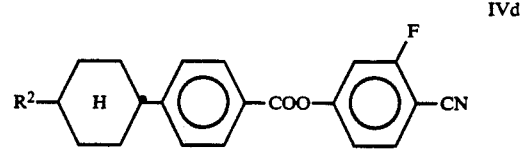
IVc

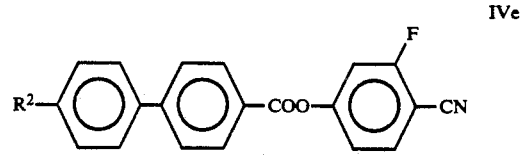
IVd

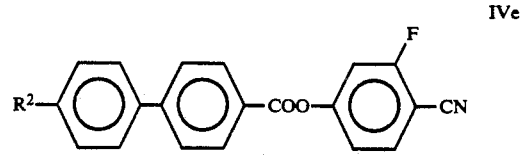
IVe of which IVa, IVb and IVd, in particular IVa and IVc, are particularly preferred.

Through a suitable choice of the meanings of $R^1$, $R^2$, r, X, Y and the ring A, the addressing times, the threshold voltage, the steepness of the transmission characteristic lines, etc., can be modified in the desired manner. For example, 1E-alkenyl radicals, 3E-alkenyl radicals and the like generally result in shorter addressing times, improved nematic phase ranges and a higher ratio between the elastic constants $k_{33}$ (bend) and $K_{11}$ (splay) compared with alkyl or alkoxy radicals. 4-Alkenyl radicals, 3-alkenyloxy radicals and the like generally give lower threshold voltages and smaller values of $k_{33}/k_{11}$ compared with alkyl and alkoxy radicals.

The optimum mixing ratio of the compounds of the formula I and IV depends substantially on the desired properties, on the choice of the components of the formula I and IV and on the choice of any other components which may be present Suitable mixing ratios within the abovementioned range can easily be determined from case to case. In general, a ratio between the total weight of compounds of the formula I and the total weight of compounds of the formula IV of from about 3:1 to 10:1 is preferred.

The total amount of compounds of the formula I and IV in the mixtures according to the invention is not crucial. The mixtures can therefore contain one or more further components in order to optimize various properties. However, the observed effect on the addressing times and the threshold voltage is generally the greater, the higher the total concentration of the compounds of the formula I and IV.

Preferred mixtures according to the invention are therefore those in which the proportion of compounds of the formulae I and IV together in the total mixture is at least 50% by weight, and in particular those in which the proportion of compounds of the formula I and IV together is at least 65% by weight. It goes without saying that the proportion may also be up to 100% by weight.

Preferred concentration ranges for the compounds of the formula I or IV arise from the indicated weight ratios and the preferred total amounts. Particular preference is given to mixtures in which the proportion of one or more compounds of the formula IV in the total mixture is 10–40% by weight, in particular 10–30% by weight. Furthermore, particularly preferred mixtures are those in which the proportion of one or more compounds of the formula I in the total mixture is at least 15% by weight, in particular at least 30% by weight.

The mixtures according to the invention preferably contain one or more compounds of the formula Ia. The total amount of compounds of the formula Ia in the mixture is preferably at least 8% by weight, particularly preferably at least 15% by weight.

The mixtures according to the invention may also contain one or more compounds of the formula Ib and/or Ic. The total amount of any compounds of the formula Ib and/or Ic which may be present in the mixture is preferably at least 5% by weight, particularly preferably at least 10% by weight. If the mixture according to the invention contains one or more compounds of the formula Ia and one or more compounds of the formula Ib and/or Ic, the weight ratio between the compounds of the formula Ia and the compounds of the formula Ib and/or Ic is preferably at least 1:1.

The mixtures according to the invention are particularly suitable for nematic and cholesteric applications. The mixture of the compounds of the formulae I, II, III and/or IV can be used as such or mixed with further liquid-crystalline and/or non-liquid-crystalline components. Suitable further components are known to a person skilled in the art and some are commercially available, such as, for example, nematic or nematogenic (monotropic or isotropic) substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexanecarboxylic acid, cyclohexylphenyl esters of benzoic acid, of cyclohexanecarboxylic acid and of cyclohexylcyclohexanecarboxylic acid, phenylcylclohexanes, cyclohexylbiphenyls, phenylcyclohexylcyclohexanes, cyclohexylcyclohexanes, cylcohexylcyclohexenes, cyclohexylcyclohexylcyclohexenes, 1,4-bis-cyclohexylbenzenes, 4,4'-biscyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of media according to the invention can be characterized by the formulae 1, 2, 3, 4 and 5:

   (1)

   (2)

   (3)

   (4)

   (5)

In the formulae 1, 2, 3, 4 and 5, L and E, which may be identical or different, are in each case, independently of one another, a bivalent radical from the group formed by —Phe—, —Cyc—, —Phe—Phe—, —Phe—Cyc—, —Cyc—Cyc—, —Pyr—, —Dio—, —G—Phe— and —G—Cyc— and their mirror images, where Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe—Cyc. The media according to the invention preferably contain one or more components selected from the compounds of the formulae 1, 2, 3, 4 and 5 in which L and E are selected from the group comprising Cyc, Phe and Pyr and simultaneously one or more components selected from the compounds of the formulae 1, 2, 3, 4 and 5 in which one of the radicals L and E is selected from the group comprising Cyc, Phe and Pyr and the other radical is selected from the group comprising —Phe—Phe—, —Phe—Cyc—, —Cyc—Cyc—, —G—Phe— and —G—Cyc—, and optionally one or more components selected from the compounds of the formulae 1, 2, 3, 4 and 5 in which the radicals L and E are selected from the group comprising —Phe—Cyc—, —Cyc—Cyc—, —G—Phe— and —G—Cyc—.

In a preferred sub-group of the compounds of the formulae 1, 2, 3, 4 and 5, R' and R" are in each case, independently of one another, alkyl, alkenyl, alkoxy, alkenyloxy or alkanoyloxy having up to 8 carbon atoms (Group 1). In most of these compounds, R' and R" are different from one another, one of these radicals usually being alkyl or alkenyl. In a further preferred sub-group of the compounds of the formulae 1, 2, 3, 4 and 5, R" is —CN, —CF$_3$, F, Cl or —NCS; in this case, R has the meaning given for the compounds of Group 1 and is preferably alkyl or alkenyl (Group 2). However, other variants of the proposed substituents in the compounds of the formulae 1, 2, 3, 4 and 5 are common. Many such substances or alternatively mixtures thereof are commercially available. All these substances can be obtained by methods which are known from the literature or analogously thereto.

Besides components from Group 1, the mixtures according to the invention preferably also contain components from Group 2, whose proportions are preferably as follows:

Group 1: 20 to 90%, in particular 30 to 90%,
Group 2: 10 to 80%, in particular 10 to 50%,
the sum of the proportions of the compounds of the formulae I, II, III and IV and of the compounds from Groups 1 and 2 adding up to 100%.

The mixtures according to the invention preferably contain 1 to 40%, in particular preferably 5 to 30%, of compounds according to the invention. Further preferred media are those which contain more than 40%, in particular 45 to 90%, of compounds according to the invention. The media preferably contain three, four or five compounds according to the invention.

Besides one or more compounds of the formulae I and II, III and/or IV, the liquid-crystalline mixtures according to the invention preferably contain, as further constituents, 2 to 40, in particular 4 to 30, components. These mixtures very particularly preferably contain 7 to 25 components in addition to one or more compounds of the formulae I and II, III and/or IV.

If desired, the mixtures according to the invention may also contain one or more compounds having high optical anisotropy, for example from the group of the compounds of the general formulae

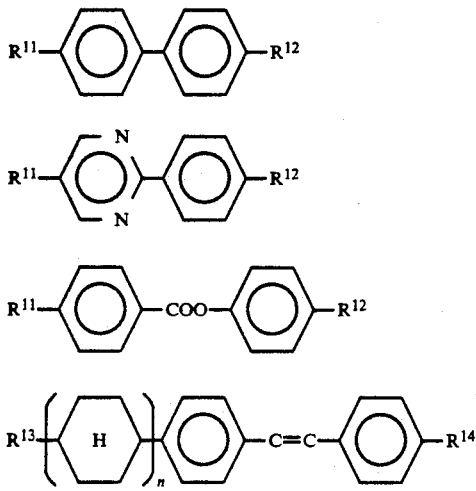

in which the radicals $R^{11}$ and $R^{12}$, independently of one another, are $C_1$-$C_{12}$-alkyl, $C_1$-$C_{12}$-alkoxy, $C_2$-$C_{12}$-alkenyl or $C_3$-$C_{12}$-alkenyloxy, or one of the radicals $R^{11}$ and $R^{12}$ is alternatively cyano: $R^{13}$ is $C_1$-$C_{12}$-alkyl; R is $C_1$-$C_{12}$-alkyl, $C_1$-$C_1$-alkoxy, cyano, fluorine or chlorine; and n is the number 0 or 1. However, the proportion of these compounds should be relatively low, since otherwise the optical anisotropy of the mixture is increased too much.

The mixtures according to the invention may also contain one or more optically active compounds. Examples of suitable optically active compounds are the cholesteryl derivatives (for example cholesteryl chloride or cholesteryl nonanoate), and with a chiral side chain [for example optically active 4-(2-methylbutyl or 2-methylbutoxy)-4-biphenylcarbonitrile]. If desired, one or more compounds of the formula I and/or II may also be optically active compounds containing a branched, chiral side chain (for example 2-methylbutyl or 2-methylbutoxy). The mixtures according to the invention may furthermore contain one or more dichroic dyes (for example azo, azoxy and/or anthraquinone dyes). The proportion of optically active compounds and/or dyes is determined by the solubility, the desired pitch, color, extinction and the like. In general, the proportion of optically active compounds with dichroic dyes is at most in each case about 10% by weight in the total mixture.

The mixtures according to the invention and the electrooptical devices which contain this mixture as liquid-crystalline dielectric can be produced by methods known per se.

The invention is illustrated further by the examples below. C denotes a crystalline phase, S a smectic phase, $S_B$ a smectic B phase, N a nematic phase and I the isotropic phase. $V_{10}$ denotes the voltage for 10% transmission (view angle perpendicular to the plate surface). $t_{on}$ denotes the switch-on time and $t_{off}$ the switch-off time at an operating voltage corresponding to 2.5 times the value of $V_{on}$ denotes the optical anisotropy and $n_0$ the refractive index for the NaD-Line, unless otherwise stated. $\Delta\epsilon$ denotes the dielectric anisotropy ($\Delta\epsilon=\epsilon\|$, where $\Delta\|$ denotes the dielectric constant parallel to the longitudinal molecular axes and $\Delta\perp$ denotes the dielectric constant perpendicular thereto. The electrooptical data were measured at 20° C. in a TN cell at a plate separation matched to the optical delay desired, unless expressly stated otherwise. The optical data were measured at 20° C., unless expressly stated otherwise.

EXAMPLE 1

A mixture comprising
13% of 2-p-cyanophenyl-5-propyl-1,3-dioxane,
13% of 2-p-cyanophenyl-5-butyl-1,3-dioxane,
9% of 4-ethyl-4'-cyanobiphenyl,
8% of 4-butyl-4'-cyanobiphenyl,
6% of p-cyanophenyl p-ethylbenzoate,
4% of p-cyanophenyl p-propylbenzoate,
11% of p-chlorophenyl trans-4-butylcyclohexanecarboxylate,
9% of p-chlorophenyl trans-4-hexylcyclohexanecarboxylate,
11% of p-chlorophenyl p-(trans-4-propylcyclohexyl)-benzoate,
10% of p-chlorophenyl p-(trans-4-pentylcyclohexyl)-benzoate,
3% of p-(trans-4-propylcyclohexyl)phenyl trans-4-butylcyclohexanecarboxylate and
3of p-(trans-4-propylcyclohexyl)phenyl trans-4-pentylcyclohexanecarboxylate
has a viscosity of 25 mPa.s at 20°, N 74° I, $V_{10}=1.1$ volts and $\Delta n=0.14$.

EXAMPLE 2

A mixture comprising
13% of 4-ethyl-4'-cyanobiphenyl,
13% of 4-propyl-4'-cyanobiphenyl,
9% of 2-p-cyanophenyl-5-butylpyrimidine,
8% of 2-p-cyanophenyl-5-pentylpyrimidine,
9% of p-methoxyphenyl trans-4-propylcyclohexanecarboxylate,
7% of p-ethoxyphenyl trans-4-propylcyclohexanecarboxylate,
16% of p-chlorophenyl trans-4-pentylcyclohexanecarboxylate,
14% of p-chlorophenyl trans-4-hexylcyclohexanecarboxylate,
6% of p-chlorophenyl trans-4-(trans-4-propylcyclohexyl)cyclohexanecarboxylate and
5% of p-chlorophenyl trans-4-(trans-4-pentylcyclohexyl)cyclohexanecarboxylate
has a viscosity of 19 mPa.s at 20°, N 60° I, $V_{10}=1.3$ volts and $\Delta n=0.15$.

EXAMPLE 3

A mixture comprising
15% of p-(trans-4-propylcyclohexyl)benzonirile [sic],
16% of p-(trans-4-butylcyclohexyl)benzonitrile,
17% of p-(trans-4-pentylcyclohexyl)benzonitrile,
10% of 4-ethyl-4,-cyanobiphenyl,
6% of p-chlorophenyl trans-4-hexylcyclohexanecarboxylate,
5% of p-chlorophenyl trans-4-hexylcyclohexanecarboxylate,
7% trans-1-p-propylphenyl-4-pentylcyclohexane,
4% of 4,4'-bis(trans-4-propylcyclohexyl)biphenyl, 5% of 4-(trans-4-pentylcyclohexyl)-4'-(trans-4-propylcyclohexyl)biphenyl,
5% of 4-(trans-4-pentylcyclohexyl)-4'-(trans-4-propylcyclohexyl)-2-fluorobiphenyl,
6% of 4,4'-bis(trans-4-propylcyclohexyl)-2-fluorobiphenyl and
4% of 4,4,-bis(trans-4-pentylcyclohexyl)-2-fluorobiphenyl has a viscosity of 23 mPa.s at 20°, N 88° I, $\Delta n=0.136$ and $V_{10}=1.8$ volts.

In a supertwist display (240° twist, high tilt), this mixture has a steep characteristic line at $V_{10}=2.0$ volts.

EXAMPLE 4

A mixture comprising
13% of 2-p-cyanophenyl-5-propyl-1,3-dioxane,
13% of 2-p-cyanophenyl-5-butyl-1,3-dioxane,
9 of 4-ethyl-4'-cyanobiphenyl,
8% of 4-butyl-4'-cyanobiphenyl,
6% of p-cyanophenyl p-ethylbenzoate,
4% of p-cyanophenyl p-propylbenzoate,
11% of p-chlorophenyl trans-4-butylcyclohexanecarboxylate,
9% of p-chlorophenyl trans-4-hexylcyclohexanecarboxylate,
11% of p-chlorophenyl p-(trans-4-propylcyclohexyl)benzoate,
10% of p-chlorophenyl p-(trans-4-pentylcyclohexyl)benzoate,
3% of p-(trans-4-propylcyclohexyl)phenyl trans-4-butylcyclohexanecarboxylate and
3% of p-(trans-4-propylcyclohexyl)phenyl trans-4-pentylcyclohexanecarboxylate has a viscosity of 25 mPa.s at 20°, N 74° I, $V_{10}=1.1$ volts and $\Delta n=0.14$.

EXAMPLE 5

A mixture comprising
13% of 2-p-cyanophenyl-5-propyl-1,3-dioxane,
13% of 2-p-cyanophenyl-5-butyl-1,3-dioxane,
9% of p-(trans-4-propylcyclohexyl)benzonitrile,
8% of p-(trans-4-butylcyclohexyl)benzonitrile,
9% of p-methoxyphenyl trans-4-propylcyclohexanecarboxylate,
7% of p-ethoxyphenyl trans-4-propylcyclohexanecarboxylate,
16% of p-chlorophenyl trans-4-butylcyclohexanecarboxylate,
14% of p-chlorophenyl trans-4-hexylcyclohexanecarboxylate,
6% of p-chlorophenyl trans-4-(trans-4-propylcyclohexyl)cyclohexanecarboxylate and
5% of p-chlorophenyl trans-4-(trans-4-pentylcyclohexyl)cyclohexanecarboxylate has a viscosity of 17 mPa.s at 20°, N 61° I, $V_{10}=1.4$ volts and $\Delta n=0.11$.

EXAMPLE 6

A mixture comprising
14% of 2-p-cyanophenyl-5-propyl-1,3-dioxane,
13% of 2-p-cyanophenyl-5-butyl-1,3-dioxane,
10% of p-cyanophenyl p-ethylbenzoate,
8% of p-cyanophenyl p-propylbenzoate,
10% of p-methoxyphenyl trans-4-propylcyclohexanecarboxylate,
8% of p-ethoxyphenyl trans-4-propylcyclohexanecarboxylate,
12% of p-chlorophenyl trans-4-butylcyclohexanecarboxylate,
10% of p-chlorophenyl trans-4-hexylcyclohexanecarboxylate,
5% of p-chlorophenyl trans-4-(trans-4-propylcyclohexyl)cyclohexanecarboxylate,
3% of p-chlorophenyl trans-4-(trans-4-pentylcyclohexyl)cyclohexanecarboxylate,
4% of p-chlorophenyl p-(trans-4-propylcyclohexyl)benzoate and
3% of p-chlorophenyl p-(trans-4-pentylcyclohexyl)benzoate has a viscosity of 22 mPa.s at 20°, N 66° I, $V_{10}=1.2$ volts and $\Delta n=0.13$.

EXAMPLE 7

A mixture comprising
13% of 2-p-cyanophenyl-5-propyl-1,3-dioxane,
13% of 2-p-cyanophenyl-5-butyl-1,3-dioxane,
9% of p-cyanophenyl p-ethylbenzoate,
8% of p-cyanophenyl p-propylbenzoate,
9% of p-methoxyphenyl trans-4-propylcyclohexanecarboxylate,
7% of p-ethoxyphenyl trans-4-propylcyclohexanecarboxylate,
16% of p-chlorophenyl trans-4-butylcyclohexanecarboxylate,
14% of p-chlorophenyl trans-4-hexylcyclohexanecarboxylate,
6% of p-chlorophenyl trans-4-(trans-4-propylcyclohexyl)cyclohexanecarboxylate and
5% p-chlorophenyl trans-4-(trans-4-pentylcyclohexyl)cyclohexanecarboxylate has a viscosity of 18 mPa.s at 20°, N 63° I, $V_{10}=1.2$ volts and $\Delta n=0.12$.

EXAMPLE 8

A mixture comprising
4% of p-(trans-4-heptylcyclohexyl)benzonitrile,
5% of 2-p-cyanophenyl-5-butyl-1,3-dioxane,
4% of 2-p-cyanophenyl-5-pentyl-1-,3-dioxane,
8% of p-cyanophenyl p-ethylbenzoate,
6% of p-cyanophenyl p-propylbenzoate,
10% of trans-1-p-ethylphenyl-4-propylcyclohexane,
12% of trans-1-p-propylphenyl-4-pentylcyclohexane,
6% of p-chlorophenyl p-trans-4-propylcyclohexyl)benzoate,
6% of p-chlorophenyl p-(trans-4-pentylcyclohexyl)benzoate,
9% of p-chlorophenyl trans-4-(trans-4-propylcyclohexyl)cyclohexanecarboxylate
7% of p-chlorophenyl trans-4-(trans-4-pentylcyclohexyl)cyclohexanecarboxylate,
12% of p-chlorophenyl trans-4-butylcyclohexanecarboxylate and
11% of p-chlorophenyl trans-4-hexylcyclohexanecarboxylate has a viscosity of 18 mPa.s at 20°, N 61° I, $V_{10}=1.4$ volts and $\Delta n=0.12$.

EXAMPLE 9

A mixture comprising
15% of p-(trans-4-propylcyclohexyl)benzonitrile,
16% of p-(trans-4-butylcyclohexyl)benzonitrile,
17% of p-(trans-4-pentylcyclohexyl)benzonitrile,
% of 4-ethyl-4'-cyanobiphenyl,
6% of p-chlorophenyl trans-4-butylcyclohexanecarboxylate, 5% of p-chlorophenyl trans-4-hexylcyclohexanecarboxylate,
7% of trans-1-p-propylphenyl-4-pentylcyclohexane,
4% of 4,4'-bis(trans-4-propylcyclohexyl)biphenyl,
5% of 4-(trans-4-pentylcyclohexyl)-4'-(trans-4-propylcyclohexyl)biphenyl,
5% of 4-(trans-4-pentylcyclohexyl)-4'-(trans-4-propylcyclohexyl)-2-fluorophenyl [sic],
6% of 4,4'-bis(trans-4-propylcyclohexyl)-2-fluorobiphenyl and
4% of 4,4'-bis(trans-4-pentylcyclohexyl)-2-fluorobiphenyl has a viscosity of 23 mPa.s at 20°, N 88° I, $\Delta n=0.136$ and $V_{10}=1.8$ volts.

In a supertwist display (240° twist, high tilt), this mixture has a steep characteristic line at $V_{10}=2.0$ volts.

EXAMPLE 10

A mixture comprising
13% of 2-p-cyanophenyl-5-propyl-1,3-dioxane,
13% of 2-p-cyanophenyl-5-butyl-1,3-dioxane,
9% of 4-ethyl-4'-cyanobiphenyl,
8% of 4-butyl-4'-cyanobiphenyl,
6% of p-cyanophenyl p-ethylbenzoate,
4% of p-cyanophenyl p-propylbenzoate,
11% of p-chlorophenyl trans-4-butylcyclohexanecarboxylate,
9% of p-chlorophenyl trans-4-hexylcyclohexanecarboxylate,
11% of p-chlorophenyl p-(trans-4-propylcyclohexyl)benzoate,
10% of p-chlorophenyl p-(trans-4-pentylcyclohexyl)benzoate,
3% of p-(trans-4-propylcyclohexyl)phenyl trans-4-butylcyclohexanecarboxylate and
3% of p-(trans-4-propylcyclohexyl)phenyl trans-4-pentylcyclohexanecarboxylate has a viscosity of 25 mPa.s at 20°, N 74° I, $V_{10}=1.1$ volts and $\Delta n=0.14$.

EXAMPLE 11

A mixture comprising
14% of 2-p-cyanophenyl-5-butyl-1,3-dioxane,
13% of p-cyanophenyl p-ethylbenzoate,
10% of p-cyanophenyl p-propylbenzoate,
8% of p-methoxyphenyl trans-4-propylcyclohexanecarboxylate,
10% of p-ethoxyphenyl trans-4-propylcyclohexanecarboxylate,
8% of p-chlorophenyl trans-4-butylcyclohexanecarboxylate,
12% of p-chlorophenyl trans-4-hexylcyclohexanecarboxylate,
10% of p-chlorophenyl trans-4-hexylcyclohexanecarboxylate,
5% of p-chlorophenyl trans-4-(trans-4-pentylcyclohexyl)cyclohexanecarboxylate,
3% of p-chlorophenyl trans-4-(trans-4-pentylcyclohexyl)cyclohexanecarboxylate,
4% of p-chlorophenyl p-(trans-4-propylcyclohexyl)benzoate and
3% of p-chlorophenyl p-(trans-4-pentylcyclohexyl)benzoate has a viscosity of 22 mPa.s at 20°, N 66° I, $V_{10}=1.2$ volts and $\Delta n=0.13$.

EXAMPLE 12

A mixture comprising
13% of 2-p-cyanophenyl-5-propyl-1,3-dioxane,
13% of 2-p-cyanophenyl-5-butyl-1,3-dioxane,
9% of p-cyanophenyl p-ethylbenzoate,
8% of p-cyanophenyl p-propylbenzoate,
9% of p-methoxyphenyl trans-4-propylcyclohexanecarboxylate,
7% of p-ethoxyphenyl trans-4-propylcyclohexanecarboxylate,
16% of p-chlorophenyl trans-4-butylcyclohexanecarboxylate,
14% of p-chlorophenyl trans-4-hexylcyclohexanecarboxylate,
6% of p-chlorophenyl trans-4-(trans-4-propylcyclohexyl)cyclohexanecarboxylate and
5% of p-chlorophenyl trans-4-(trans-4-pentylcyclohexyl)cyclohexanecarboxylate has a viscosity of 18 mPa.s at 20°, N 63° I, $V_{10}=1.2$ volts and $\Delta n=0.12$.

EXAMPLE 13

A mixture comprising
4% of p-(trans-4-heptylcyclohexyl)benzonitrile,
5% of 2-p-cyanophenyl-5-butyl-1,3-dioxane,
4% of 2-p-cyanophenyl-5-pentyl-1,3-dioxane,
8% of p-cyanophenyl p-ethylbenzoate,
6% of p-cyanophenyl p-propylbenzoate,
10% of trans-1-p-ethylphenyl-4-propylcyclohexane,
12% of trans-1-p-propylphenyl-4-pentylcyclohexane,
6% of p-chlorophenyl p-(trans-4-propylcyclohexyl)benzoate,
6% of p-chlorophenyl p-(trans-4-pentylcyclohexyl)benzoate,
9% of p-chlorophenyl trans-4-(trans-4-propylcyclohexyl)cyclohexanecarboxylate,
7% of p-chlorophenyl trans-4-(trans-4-pentylcyclohexyl)cyclohexanecarboxylate,
12% of p-chlorophenyl trans-4-butylcyclohexanecarboxylate and
11% of p-chlorophenyl trans-4-hexylcyclohexanecarboxylate has a viscosity of 18 mPa.s at 20°, N 61° I, $V_{10}=1.4$ volts and $\Delta n=0.12$.

EXAMPLE 14

A mixture comprising
5% of 3-fluoro-4-cyanophenyl p-propylbenzoate,
5% of 3-fluoro-4-cyanophenyl p-butylbenzoate,
7% of 3-fluoro-4-cyanophenyl p-pentylbenzoate,
5% of 3-fluoro-4-cyanophenyl p-heptylbenzoate,
8% of trans-1-p-ethylphenyl-4-propylcyclohexane,
12% of trans-1-p-propylphenyl-4-pentylcyclohexane,
9% of p-chlorophenyl trans-4-(trans-4-propylcyclohexyl)cyclohexanecarboxylate,
8% of p-chlorophenyl trans-4-(trans-4-pentylcyclohexyl)cyclohexanecarboxylate,
10% of p-chlorophenyl p-(trans-4-propylcyclohexyl)benzoate,
8% of p-chlorophenyl p-(trans-4-pentylcyclohexyl)benzoate,
12% of p-chlorophenyl trans-4-butylcyclohexanecarboxylate and
11% of p-chlorophenyl trans-4-hexylcyclohexanecarboxylate has a viscosity of 19 mPa.s at 20°, N 65° I, $V_{10}=1.2$ volts and $\Delta n=0.11$.

We claim:
1. A liquid-crystalline mixture comprising one or more compounds of formula

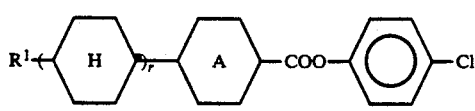

in which $R^1$ is straight-chain alkyl having 2 to 12 carbon atoms in which, in addition, one $CH_2$ group may optionally be replaced by —O— or —CH=CH—, the ring A is 1,4-phenylene or trans-1,4-cyclohexylene, and r is 0 or 1, and one or more highly dielectrically positive compounds selected from the group consisting of compounds of the formulae II, III and IV in a weight ratio between the compounds of the formula I and the compounds of the formulae II, III and IV of from 1:10 to 10:1:

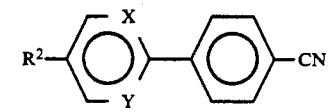

in which $R_2$ has one of the meanings indicated for $R^1$, and X and Y are each, independently of one another, CH or N,

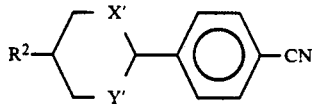

in which $R^2$ has one of the meanings indicated above for $R^2$, and X' and Y' are CH or O,

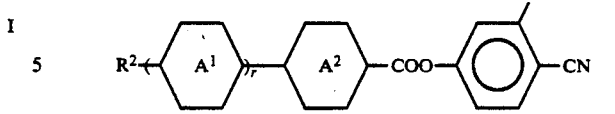

in which $R^2$ has one of the meanings indicated above for $R^1$, r is as defined above, the rings $A^1$ and $A^2$ have one of the meanings indicated above for A, and L is H or F, wherein the proportion of compounds of the formula I, II, III and IV together in the total mixture is at least 50% by weight.

2. The liquid-crystalline mixture according to claim 1, characterized in that the proportion of compounds of the formula II, III or IV in the total mixture is 10–40% by weight.

3. The liquid-crystalline mixture according to claim 1, characterized in that the proportion of compounds of the formula I in the total mixture is at least 15% by weight.

4. The liquid-crystalline mixture according to claim 1, characterized in that it contains one or more compounds of the formulae Ia, Ib and/or Ic

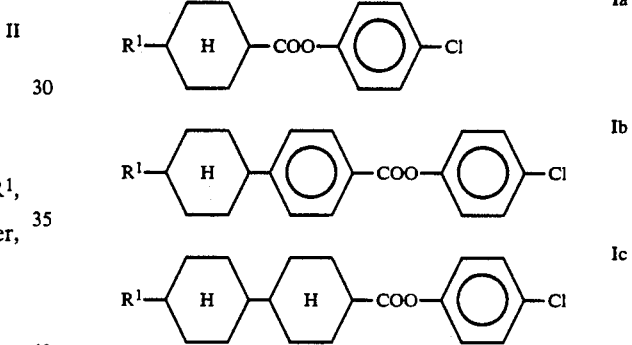

in which R' is as defined above, in a total amount of at least 25% by weight.

5. The liquid-crystalline mixture according to claim 1, characterized in that $R^1$ and $R^2$ are each n-alkyl having 2 to 7 carbon atoms.

6. An electrooptical device containing as a dielectric a liquid-crystalline mixture of claim 1.

* * * * *

UNITED STATES PATENT AND TRADEMARK OFFICE
CERTIFICATE OF CORRECTION

PATENT NO. : 5,271,865
DATED : December 21, 1993
INVENTOR(S) : Reinhard HITTICH et al.

It is certified that error appears in the above-identified patent and that said Letters Patent is hereby corrected as shown below:

Title Page; Item (30) Foreign Application Priority Data:

Change the third priority number to read . . 4005238

Change the fourth priority number to read. . .4005239

Signed and Sealed this

Thirty-first Day of May, 1994

Attest:

BRUCE LEHMAN

*Attesting Officer*  *Commissioner of Patents and Trademarks*